United States Patent [19]

Satoh

[11] 4,285,014
[45] Aug. 18, 1981

[54] CHANNEL DIVISION RECORDING/REPRODUCING APPARATUS

[75] Inventor: Ken Satoh, Akikawa, Japan

[73] Assignee: Olympus Optical Co., Ltd., Tokyo, Japan

[21] Appl. No.: 128,374

[22] Filed: Mar. 10, 1980

[30] Foreign Application Priority Data

Mar. 20, 1979 [JP] Japan .................................. 54-32950

[51] Int. Cl.³ .............................................. H04N 5/79
[52] U.S. Cl. ..................................... 360/22; 358/127; 360/33
[58] Field of Search ........................ 360/22, 23, 32, 33, 360/26, 27; 358/167, 133, 138, 127, 8

[56] References Cited

U.S. PATENT DOCUMENTS 4,048,658  9/1977  Nakagawa .......................... 360/22 X Primary Examiner—Daryl W. Cook
Assistant Examiner—Donald McElheny, Jr.
Attorney, Agent, or Firm—Frishauf, Holtz, Goodman and Woodward

[57] ABSTRACT

A channel division recording/reproducing apparatus is provided for dividing an input signal into signals for a plurality of channels through an Hadamard transformation, frequency modulating the signals of the respective channels and recording them and, after demodulating the recorded signals for the respective channels, subjecting the demodulated signals to an Hadamard inverse transformation and reproducing the input signal. Out of the Hadamard-transformed signals, the signal on the channel of the minimum frequency band is separated by a filter from the input signal and the separated signal processed by an additional Hadamard transformer and Hadamard inverse transformer and frequency modulated with a modulation index greater than the original signal and with a carrier of a lower frequency. An impovement in signal-to-noise ratio is thereby obtained. When recording a video signal, the "beat" phenomenon between the video signal and carrier signal is reduced while the signal-to-noise ratio of the video signal as a whole is improved.

4 Claims, 1 Drawing Figure

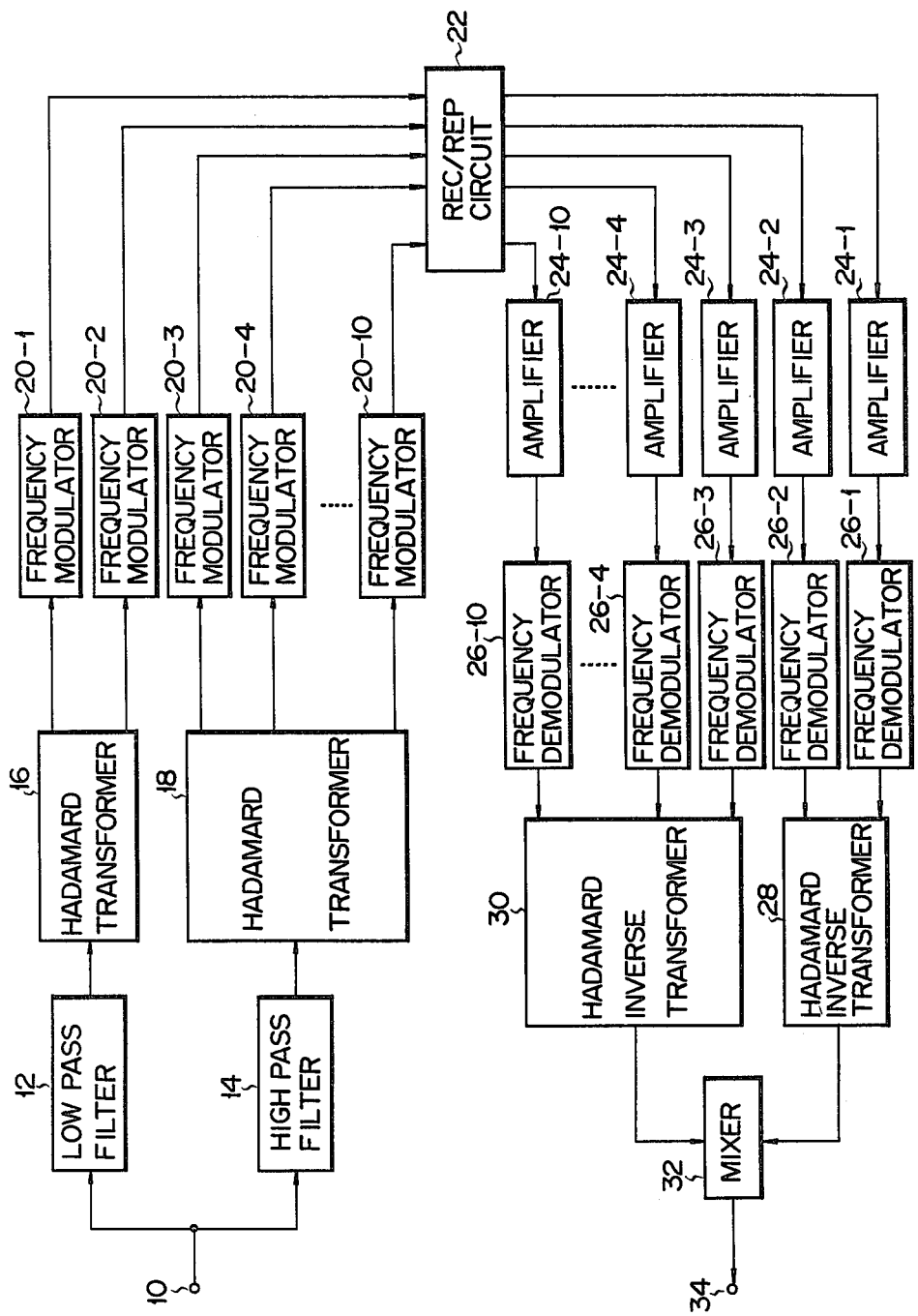

CHANNEL DIVISION RECORDING/REPRODUCING APPARATUS

BACKGROUND OF THE INVENTION

This invention relates to a channel division recording/reproducing apparatus adapted to divide a broad band signal such as a video signal into narrow band signals for a plurality of channels for recording and reproduction.

In order to record a video signal such as a television signal, etc., it is generally necessary that the frequency band of a recording system be made broad enough to meet that of the video signal. In an attempt to make the relative speed of a magnetic head and magnetic tape higher, for example, in a video tape recorder both the tape and the head may be rotated, but a structural difficulty is often encountered by doing so. Where, on the other hand, the magnetic head is not rotated, the travelling speed of the tape has to be made higher, presenting a structural problem. Moreover, more tape has to be used. Recently, attempts have been made to divide a video signal into narrow band signals for a plurality of channels and record them through a corresponding number of fixed heads. As such a division method, an Hadamard transformation is known which divides an original signal by sequency components similar to frequency components into a plurality of channel signals. The Hadamard transformation is one kind of an orthogonal transformation and an input signal is Hadamard-transformed using a Walsh function. Now suppose that a 2 MHz luminance signal is used as an input signal and that the Walsh function is a function of the eighth order. Then, the luminance signal is, after Hadamard transformation, divided into narrow band signals of eight channels of 250 KHz. The narrow band signals are frequency modulated for the respective channels and supplied to the magnetic heads. Now suppose that the carrier frequency of the respective modulators is set, for example, at 700 KHz, a value sufficiently higher than 250 KHz. Even if in this case a greater frequency deviation is taken, a modulation index can be made greater without involving a "beat" phenomenon between the luminance signal and the carrier signal, thus leading to an improvement in the signal-to-noise ratio (S/N ratio) as well as in the quality of a luminance signal recorded. In actual practice, however, the frequency of the carrier signal can not be sufficiently high in view of a relation between the travelling speed of the magnetic tape and the wavelength of the luminance signal. If the modulation index is made greater and a frequency deviation is made greater to improve the S/N ratio for a too low carrier frequency, a "beat" phenomenon occurs between the luminance signal and the carrier signal, thus degenerating the S/N ratio.

SUMMARY OF THE INVENTION

It is accordingly an object of the invention to provide a channel division recording/reproducing apparatus which can divide a broad band signal into narrow band signals for a plurality of channels and record and reproduce an input signal with a better S/N ratio.

According to this invention there is provided a channel division recording/reproducing apparatus comprising means for dividing an input signal into first and second frequency signals, first orthogonal transforming means for transforming the first frequency signal into narrow band signals for a plurality of channels, second orthogonal transforming means for transforming the second frequency signal into narrow band signals for a plurality of channels, a narrow band signal on the channel of a minimum frequency band being equal in frequency to the first frequency signal, means for frequency modulating the output signals of the first and second orthogonal transforming means for the respective channels and recording them on a recording medium, and means for demodulating the recorded signals on a recording medium for the respective channels, subjecting the demodulated signals to an orthogonal inverse transformation for the first and second frequencies and reproducing the first and second frequency signals.

BRIEF DESCRIPTION OF THE DRAWING

This invention will be described below by way of example by reference to the accompanying drawing showing a circuit diagram of a channel division recording/reproducing apparatus embodying the invention.

DETAILED DESCRIPTION OF THE INVENTION

An input terminal 10 is connected to a low-pass filter 12 and high-pass filter 14. A video signal from an image pickup camera or television receiver is supplied to the input terminal 10. Now suppose that the video signal has a frequency of 2 MHz and that the pass bands of the low- and high-pass filters are below 250 KHz and in excess of 250 KHz, respectively. The output of the low-pass filter 12 is connected to an Hadamard transformer 16 of the second order and the output of the high-pass filter 14 to an Hadamard transformer 18 of the eighth order. The two output channel signals of the Hadamard transformer 16 are supplied through frequency modulators 20-1 and 20-2 to a record/reproduce circuit 22 and the eight output channel signals of the Hadamard transformer 18 are supplied through frequency modulators 20-3, 20-4 . . . and, 20-10 to the record/reproduce circuit 22. The record/reproduce circuit 22 has ten fixed magnetic heads each corresponding to a respective channel. Signals detected at the respective magnetic heads are supplied respectively through amplifiers 24-1, 24-2 . . . and 24-10 to frequency demodulators 26-1, 26-2 . . . and 26-10. The outputs of the frequency demodulators 26-1 and 26-2 are supplied to an Hadamard inverse transformer 28 of the second order and the outputs of the frequency demodulators 26-3, 26-4 . . . and 26-10 to an Hadamard inverse transformer 30 of the eighth order. The output of the Hadamard transformer 28 is connected to one input of a mixer 32 and the output of the Hadamard inverse transformers 30 to the other input of the mixer 32. The output of the mixer 32 is connected to an output terminal 34.

The operation of the embodiment will now be explained below.

A signal of 250 KHz is supplied to the Hadamard transformer 16 to produce 0–125 KHz and 125–250 KHz channel signals. Thus, frequency bandwidths of 125 KHz are provided. Even if the frequency of a carrier signal is not high enough, when a greater frequency deviation is made, the frequency modulators 20-1 and 20-2 can have a greater modulation index without involving the beating between video and carrier signals, leading to an improvement in S/N ratio. A 2 MHz signal is supplied to the Hadamard transformer 18 to produce eight 250 KHz channel signals. Since, however, the 0 to 250 KHz signal is cut off by the high-pass filter 14, no signal appears from a first output channel of the Hadamard transformer 18. The 250 to 500 KHz, . . . and 17,500 KHz to 2 MHz signals appear from the second, . . . and eighth output channels, respectively. As the signals of a bandwidth of 250 KHz are supplied to the modulators 20-4 . . . and 20-10, if a greater frequency deviation is taken to improve the S/N ratio, a "beat" phenomenon occurs between the video signal and the carrier signal. For this reason, no greater frequency deviation can be made, failing to improve the S/N ratio. In an orthogonal transformation such as the Hadamard transformation, however, the energies of signals after transformation are concentrated on low frequency channels. Even if, therefore, the S/N ratio of the high frequency channels of the video signals is degenerated, the S/N ratio of the signal suffers no substantial influence. That is, if the S/N ratio of only the low frequency channels of the video signal is improved as in this embodiment, it contributes to the video signal as a whole and thus the S/N ratio of the video signal as a whole is improved. In this way, the video signal is divided into a plurality of channel signals, which are recorded, through the respective magnetic head, on a magnetic tape for the respective channel.

During the reproduce mode, signals are detected through the magnetic heads for the respective channel in a way reversed with respect to the record mode, and signals of 0 to 125 KHz and 125 to 250 KHz are supplied through the frequency demodulators 26-1 and 26-2 to the Hadamard inverse transformer 28 to permit the output of the low-pass filter to be reproduced. Signals of 250 to 500 KHz, . . . and 17,500 KHz to 2 MHz are supplied respectively through the frequency demodulators 26-4, . . . and 26-10 to the Hadamard inverse transformer 30 to permit the output of the high pass filter 14 to be reproduced. The outputs of the Hadamard inverse transformers 28 and 30 are mixed and an input video signal is reproduced at the output terminal 34. Although the modulator 20-3, amplifier 24-3 and demodulator 26-3 for the first channel (0 to 250 KHz) associated with the Hadamard-transformed frequency components of the higher video signal (250 KHz to 2 MHz) are shown in the drawing, they may be omitted. A proper orthogonal transformation, such as an Haar transformation, other than the Hadamard transformation may be used.

What is claimed is:

1. A channel division recording/reproducing apparatus comprising:
   means for dividing an input signal into first and second frequency signals;
   first orthogonal transforming means for transforming said first frequency signal into narrow band signals for a plurality of channels;
   second orthogonal transforming means for transforming said second frequency signal into narrow band signals for a plurality of channels, a narrow band signal on the channel of a minimum frequency band being equal in frequency of said first frequency signal;
   record means for frequency modulating output signals of said first and second orthogonal transforming means for the respective channels and recording them on a recording medium; and
   reproducing means for demodulating the recorded signals for the respective channels and, after subjecting the resultant demodulated signals to an orthogonal inverse transformation, reproducing said first and second frequency signals.

2. A channel division recording/reproducing apparatus comprising:
   means for dividing an input signal into first and second frequency signals;
   first orthogonal transforming means for transforming said first frequency signal into narrow band signals for a plurality of channels;
   second orthogonal transforming means for transforming said second frequency signal into narrow band signals for a plurality of channels, a narrow band signal on the channel of a minimum frequency band being equal in frequency of said first frequency signal;
   record means for frequency modulating output signals of said first and second orthogonal transforming means for the respective channels, except for the channel of a minimum frequency band signal of said second orthogonal transforming means, and recording them on a recording medium; and
   reproducing means for demodulating the recorded signals for the respective channels and, after subjecting the resultant demodulated signals to an orthogonal inverse transformation, reproducing said first and second frequency signals.

3. A channel division recording/reproducing apparatus according to claim 1 or 2, in which said record means frequency modulates the output of said first orthogonal transforming means with a modulation index greater than the modulation index used in frequency modulating the output of said second orthogonal transforming means.

4. A channel division recording/reproducing apparatus according to claim 1 or 2, in which said record means frequency modulates the output of said first orthogonal transforming means with a carrier signal of a frequency lower than that of the carrier signal used in frequency modulating the output of said second orthogonal transforming means.

* * * * *